(12) United States Patent
Wedeniwski (10) Patent No.: US 9,104,754 B2
(45) Date of Patent: Aug. 11, 2015

(54) OBJECT SELECTION BASED ON NATURAL LANGUAGE QUERIES

(75) Inventor: Sebastian Wedeniwski, Ostfildern (DE)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 13/401,941

(22) Filed: Feb. 22, 2012

(65) Prior Publication Data

US 2012/0239682 A1    Sep. 20, 2012

(30) Foreign Application Priority Data

Mar. 15, 2011  (EP) .................................. 11158197

(51) Int. Cl.
*G06F 17/30* (2006.01)
(52) U.S. Cl.
CPC ...... *G06F 17/30734* (2013.01); *G06F 17/3071* (2013.01); *G06F 17/30663* (2013.01); *G06F 17/30702* (2013.01)
(58) Field of Classification Search
CPC .................................................. G06F 17/3071
USPC ........................................................ 707/769
See application file for complete search history.

(56) References Cited

U.S. PATENT DOCUMENTS

| 6,029,195 | A   | * | 2/2000  | Herz ............................. 725/116 |
| 7,593,855 | B1  |   | 9/2009  | Craig |
| 7,680,959 | B2  |   | 3/2010  | Svendsen |
| 7,836,057 | B1  |   | 11/2010 | Micaelian et al. |
| 2002/0013735 | A1 |   | 1/2002  | Arora et al. |
| 2003/0217052 | A1 | * | 11/2003 | Rubenczyk et al. ............... 707/3 |
| 2008/0140657 | A1 | * | 6/2008  | Azvine et al. ....................... 707/6 |
| 2008/0307523 | A1 | * | 12/2008 | Subramanyam et al. ........ 726/21 |
| 2009/0077499 | A1 |   | 3/2009  | Svendsen et al. |
| 2009/0271293 | A1 |   | 10/2009 | Parkhurst et al. |
| 2012/0179453 | A1 | * | 7/2012  | Ghani et al. ....................... 704/9 |
| 2012/0226698 | A1 | * | 9/2012  | Silvestre et al. .............. 707/741 |

OTHER PUBLICATIONS

Ashish Kathuria et al., Classifying the user intent of web queries using k-means clustering, 2010, Emerald Group Publishing Limited, vol. 20 No. 5, pp. 563-581.*

* cited by examiner

*Primary Examiner* — Etienne Leroux
*Assistant Examiner* — Dara J Glasser
(74) *Attorney, Agent, or Firm* — Andrea Barbuto; Hoffman Warnick LLC (57) ABSTRACT

A method of selecting an object out of a group of objects. The object may belong to a category. The method may include receiving, object-related information indicative of properties of objects of the category by using network connected databases. The method may further include generating, an extended profile for at least one of the objects based on the received object-related information and object-specific information. The method may additionally include determining, a data structure of weighted keywords based on the natural language input using at least one out of the group consisting of a predefined dictionary, a predefined ontology, predefined system rules, and a predefined regular expression, and selecting, the object out of the group of objects based on a mapping of the extended profile and the data structure of weighted keywords resulting in a preference fit score for the selected object.

9 Claims, 8 Drawing Sheets

OBJECT SELECTION BASED ON NATURAL LANGUAGE QUERIES

TECHNICAL FIELD

The invention relates generally to a method and an engine of selecting an object out of a group of objects. The invention relates further to a computer system, a data processing program, and a computer program product.

RELATED ART

Online search and selection systems, in particular of high value consumer goods, typically rely on a selection mask. Product or service features may be selected given a rigid selections mask in a user interface. On the other side, an increasingly vast amount of structured and unstructured information about products or services is available in digital, electronic formats and distributed from various sources. The value of this information depends upon how effectively it may be retrieved to provide needed information for a specific context and interest. Especially, information about a product or an object in general and its life-cycle may be distributed over various sources, e.g., producer, vendor, seller, owner, reviewer, press articles, blogs, etc. Today, systems which consider information of products or objects described only by the vendor may suffer from several limitations.

For example, a buyer of a used car may want to know if a potential broken part was replaced by a recall from the manufacturer of a car. However, the current owner or even the seller may not know the answer, although the manufacturer of the car may have this information. Moreover, many complex consumer products like vehicles or buildings may be built by many tiers through a chain of suppliers, between which the information about parts and features may be distributed.

On the other side, consumers may have specific buying experiences and buying expectations and may not want to be limited by predefined object characteristics and vocabulary to define their needs. A strict selection mask with only dedicated and limited selection options may work for simple quantifiable characteristics, for example, an identification of a car based on price, mileage, age, fuel consumption, and other simple features.

However, consumers may have specific, individual, qualitative preferences potentially within quantifiable characteristics. That may mean, for example, that the price for a product should not only be between $10,000 and $20,000, but may also be close to a preferred price of $14,200. At present, user interfaces and search capabilities provided for buyers in electronic commerce environments may use text-searching technologies which may be as simple as a word count method or may provide predefined selection characteristics of products. In such a case, a potential buyer may not specify any other characteristics than those that an administrator may have specified in advance. This may mean that preferences which may be important to buyers such as, e.g., "4-wheel", may be impossible to be selected at the user interface of an electronic commerce environment. Furthermore, the example "4-wheel" may have different brand names for different manufacturers. Even a "table" may have different names for different car models. Such variations may not be easily maintained through predefined selection characteristics.

Moreover, in a stricting selection mask, selection options and thus, a buying experience may only be defined by relationships between the offered selection criteria. This may only be a single product view. Experiences and context worlds of buyers may not be reflected at all. For example, the definition of "safety", "comfort", "luxury" or "environmental" may depend at least on the product context and characteristics thereof. Various, existing tools, like e.g., an assistant to electronic commerce do not directly address these needs or even provide a simplified user interface.

It may be noted that the kind of problem discussed above may not be limited to selecting and buying a car, but may appear in all kinds of selecting and buying complex objects or goods that may not be selected by experts but by novices having their own way of describing technical properties of a complex object.

Several approaches have been followed in order to deal with the mentioned limitations of the existing technology. Document U.S. 2009/0271293 discloses methods and systems of establishing a shopping assistant utility. The method includes receiving product information for products, and based on the received product information, automatically generating a product profile for each of the products. The method may generate a score assigned to each of the products based on a determined level of correlation.

Document U.S. Pat. No. 7,836,057 discloses a search engine for databases, data streams, and other data sources allowing user preferences as to the relative importance of search criteria to be used to rank the output of the search engine. A weighted performance generator generates weighted preference information including at least a plurality of weights corresponding to a plurality of search criteria. A user may re-rank an ordered result list and determine newly updated weighted preferences based on the re-ranking process.

In another document U.S. Pat. No. 7,593,855, a consumptible identification system for use with a computer network is disclosed. It may include a need prioritization module adapted to obtain a prioritization of consumer needs associated with a consumptible category from a particular consumer, wherein the prioritization may express a preference of a particular consumer pertaining to at least one need associated with the category relative to at least one other need associated with the category.

However, because of limitations of the technology of the state of the art, there may be a requirement for an improved object selection system with a higher usability and adaptability to user needs. In particular, there may be a need for a system with better comprehensibility of user requirements and priorities.

SUMMARY

This need may be addressed by a method of selecting an object out of a group of objects as well as by an object selection engine according to the independent claims.

In one embodiment a method of selecting an object out of a group of objects belonging to a category may be provided. The method may comprise receiving object-related information indicative of properties of objects of the category by using network connected databases, and generating an extended profile for at least one of the objects based on the received object-related information and object-specific information indicative of properties of the at least one of the objects, such that the extended profile comprises the object-specific information as well as object-related information that is related to the object-specific information, and wherein the generating the extended profile comprises using at least one out of the group consisting of a predefined dictionary, a predefined ontology, and predefined system rules.

A user interface may be provided that may be adapted for receiving natural language input. Furthermore, the method may comprise determining a data structure of weighted keywords based on the natural language input using at least one out of the group consisting of the predefined dictionary, the predefined ontology, predefined system rules, and a predefined regular expression. Additionally, the method may comprise selecting the object out of the group of objects based on a mapping of the extended profile and the data structure of weighted keywords resulting in a preference fit score for the selected object, wherein the mapping comprises using at least one out of the group consisting of an N-Gram distance function between data elements of the extended profile and data elements of the data structure of weighted keywords, thresholds specified in the extended profile, and weights of rules.

In another embodiment, a selection engine for selecting an object out of a group of objects may be provided. The object may belong to a category. The selection engine may comprise a receiving unit adapted for receiving object-related information indicative of properties of objects of the category by using network connected databases, and a generating unit adapted for generating an extended profile for at least one of the objects based on the received object-related information and object-specific information indicative of properties of the at least one of the objects, such that the extended profile comprises the object-specific information as well as object-related information that is related to the object-specific information, and wherein the generating unit is also adapted for using at least one out of the group consisting of a predefined dictionary, a predefined ontology, predefined system rules, and a predefined regular expression, when generating the extended profile.

Furthermore, a user interface adapted for receiving natural language input may be provided. Additionally, the selection engine may comprise a determining unit adapted for determining a data structure of weighted keywords based on the natural language input using at least one out of the group consisting of a predefined dictionary, a predefined ontology, predefined system rules, and a selecting unit adapted for selecting the object out of the group of objects based on a mapping of the extended profile and the data structure of weighted keywords resulting in a preference fit score for the selected object, wherein the mapping comprises using at least one out of the group consisting of an N-Gram distance function between data elements of the extended profile and data elements of the data structure of weighted keywords, thresholds specified in the extended profile, and weights of rules.

Attention may be given to the determination and generation of the extended profile and the data structure of weighted keywords. In the mapping of these two data structures using the specified technical method components and features, a preference fit score determination as well as a related selection may be performed.

It may be noted that the object may be any kind of object, e.g., a car, a truck, a house, electronic equipment of any kind, like a mobile telephone, etc. Generally speaking, the method may be more powerful the more complex an object is and the more individual, personal preferences may play a role.

The receiving object-related information indicative of properties of objects of the category may be sources from any information source. That may be electronic libraries of any kind, information from one or more sellers of the object, Internet sources of any kind, including wikis, blogs, press articles, product descriptions from the seller or competitors, etc. In case of a used car, it may be the service history of the car, the car products history, information about the manufacturer or a specific manufacturing site of a specific car. In case of a house, it may be geospatial information, traffic information, and infrastructure information of the neighborhood, just to name a few. In general, we mean any information that may be relevant in the context of the object.

The selection of the object may be understood as a recommendation finding a good fit between object offerings and preferences of users.

It may also be noted that beside weighted keywords, the data structure may also comprise values. In case of a car as an example for an object, it may be a number of seats, the power of the engine in horsepower or kilowatt, the wheel size; basically everything that may be measurable and that may characterize the object.

Furthermore, it may be understood that the predefined dictionary, the predefined ontology, and the predefined system rules may be instrumental by defining a contextual and lexical model for relating elements of the object-related information to the object-specific information, and the object category. The dictionary may enable a correct analysis and interpretation of natural language words. Synonyms and acronyms may be translated correctly in a more standardized vocabulary. The predefined ontology may bring in a predefined model of an object and relationships between object components. The predefined systems rules may enable a context-oriented clustering of natural language terms.

In the context of this application, the following principle terms are used:

Object—In addition to the above explanation, the term object may denote any kind of object that may be selected from a group of objects. Examples have been given above. The object may belong to a category, and more specifically to an object category. In case of cars as an example for the object, the category may be passenger cars. In case of a home as an example for the object, the house may be a detached house or a family home. Many other examples may exist.

Extended profile—The term extended profile may denote a data structure being adapted for storing facts about an object, e.g., object-specific information, like a color of a car or the size of a house in square-meters. On the other side, the extended profile may be adapted to also store related information to the object-specific information. Expressions like "luxury" may be related to more expensive cars. A relative low price of a luxury car may imply that the car may be relatively old, or an accident may be the reason. "Environmentally correct" may only be related to low emissions cars or to another attribute, e.g., "particle filter". The adjective "sportive" may only be related to objects, e.g., products like cars, having a comparable high-power engine. The same may apply to the attribute "wide-base tire", "coupe", "turbo", "sports engine", or "2-seater". The extended profile may be able to store as much information as possible about the context of an object. Also, one or more pictures of the object may be stored as part of the object-specific and/or object-related information.

User interface—The term user interface may denote an interaction option for a user with a machine, e.g., a computer. Thus, a classical computer keyboard/screen combination may be a natural choice. However, also voice input and sound/artificial voice output may be used. A mouse or another pointing device may be a component of the user interface as well as a touch screen. The user interface may be adapted to receive natural language input, i.e., human unstructured text that may be spoken or written.

Natural language input—In addition to the above mentioned explanation, the term natural language input may denote a series of natural language words as they may have been written in a document or be spoken from one person to another. Only the traditional grammar may be applied. Also a fragment of sentences may qualify as natural language input.

Data structure of weighted keywords—This term may denote a data structure being adopted for storing keywords together with a weighting for each keyword. A combination of keywords and weightings may not be completely conflict free. Examples may be given below. Additionally, individual values for specific attributes (e.g., 250 horsepower) may be storable in the data structure of weighted keywords. The data structure may denote a preference or a selection criterion of a user.

Preference fit score—The term preference fit score may denote a factor, e.g., expressed in percent, relating to a relative fit of a preference of a user to one or more objects to be selected from. A preference fit score may be determined based on a plurality of different factors, in particular by an object selection engine.

The above-described method of performance monitoring may provide several advantages. In particular, the method may allow a much easier and more convenient way of selecting complex objects, in particular in the area of expensive consumer goods like cars, holidays, houses, or apartments. The same may apply to complex industrial goods and equipment that may be purchased by non-technicians having a different context background than the producer of the complex object. A conventional way of selecting objects using a computer screen showing an input mask having predefined options in check-boxes may be overcome. In such a conventional environment, a user may only select options that may have been pre-thought, pre-programmed and have been seen only through the eyes of a specific manufacturer of one specific brand. Attributes of objects may be different for different brand names, but they may not be selectable in the screen mask. The novel method and system may allow an intuitive way of selecting objects, e.g., products. Besides, this may go far beyond conventional search engines. Search engines may only search for an exact match of keywords not reflecting any additional context information.

In an embodiment of the method, the generation of the extended profile may comprise relating elements of the object-related information to features of the object-specific information. This may allow generating context clouds or tag clouds around object-specific features or attributes. Dictionaries, ontologies, and rules sets may be instrumental in the interpretation of the tags of the object-related information and a determination of relationships.

In another embodiment of the method, the generating of the extended profile may comprise building clusters of features of the object-specific information and elements of the object-related information. This may advantageously allow a quasi third dimension to a dendogram built by object attributes and object features. The dendogram may be defined by a structure of the object or product, e.g., a product like a car, a family home, an electronic article, etc. In the case of a car, key-terms found in the received object-related information as well as object-specific information may be related to an umbrella term like "comfort", "family", "performance", "sportive", "easy", "cool", "environmental", etc.

In an embodiment of the method, the preference fit score may be determined based on one out of the group consisting of a keyword factor related to the extended profile, a preference factor determined by a quadratic mean of weighted keywords, and a numeric preference factor defined through the user interface or a system of rules. These features may all be used in combination. They may all be used reflecting a plurality of different influence factors when determining the preference fit score.

In another embodiment of the method, a weighting of at least one of the weighted keywords may be modifiable using the user interface. The modifiability may be interactive. This may mean that one or more of the keywords may be displayed, e.g., in a keyword tag or tag cloud, on a screen. Keywords having a higher weighting factor may be displayed more predominant by, e.g., a larger font size, a bolder font or a more aggressive color. A user may interactively, e.g., by using a pointing device and/or a keyboard, change the appearance of the keyword and thus, the related weighting.

In another embodiment of the method, at least one of the values of the data structure may be modifiable using the user interface. Also, this modification option may be done interactively, e.g., by typing in new values or selecting other values, or using a slider on a scale. It may enable an easy change of selected values for the selection process.

An embodiment of the method may allow that the modification of the at least one value of a data structure may be performed by using a slider with at least three marks, the slider being part of the user interface. In contrast to a selection of a value out of a group of values as explained in the context of the previous embodiment, a slider with at least three marks may have additional advantages. A slider with one mark may allow defining a value. A slider with two marks may define a range with a lower and an upper value. However, a slider with three marks or markers may go far beyond such a simple concept. Three markers, besides defining a range with a lower end value and an upper end value, may also allow a definition of a preferred value that may be positioned within the range defined by the lower and upper end. The preferred value may not sit just in the middle between the lower and the upper value, i.e., a mean value. But, it may have any value within the defined range. It may not be dependable on any mathematical calculation reflecting the lower and the upper end value.

In another embodiment of the method, the determining of the data structure of weighted keywords may comprise analyzing a user profile. Such a feature may allow a much more precise and relevant determination of weighted keywords. The profile may be a public profile of, e.g., a social network like, e.g., XING®, LinkediN®, Facebook® or any other social network platform. It may also be used from a customer relationship management system. Also, solely private profiles just used for object selection may be used. The determination process for the weighted keywords may analyze preferences of a potential buyer or selector of an object, e.g., a product. His age, his family status, his friends or contact network, his address, etc., may be included in the analysis in order to determine keywords together with a proper weighting. In this sense, the method of selecting an object may inherit context-aware computing.

In another embodiment, the method may comprise displaying an identifier of the selected object together with the related preference fit score. A picture of the object may also be displayed. Furthermore, all information relevant to a user and available may also be displayed. This may allow a user to make an easy selection of the object.

In an embodiment, the selection engine may be a component of a computer system. Such a system may be part of the computing environment. This may be used in electronic shopping environments such as e-commerce systems, procurement systems, and the like.

It should be noted that embodiments may take the form of an entire hardware implementation, an entire software embodiment, or an embodiment containing both hardware and software elements. In an embodiment, the invention may be implemented in software which includes, but is not limited to, firmware, resident software and microcode.

In an embodiment, a data processing program for execution in a data processing system may be provided comprising software code portions for performing the method, as described above, when the program may be run on a data processing system. The data processing system may be a computer or computer system.

Furthermore, embodiments may take the form of a computer program product, accessible from a computer-usable, or computer-readable medium providing program code for use, by or in connection with a computer or any instruction execution system. For the purpose of this description, a computer-usable or computer-readable medium may be any apparatus that may contain means for storing, communicating, or transporting the program for use, by or in a connection with the instruction execution system, apparatus, or device.

The medium may be an electronic, magnetic, optical, electromagnetic, infrared or a semi-conductor system. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matter. In particular, some embodiments have been described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matter, in particular between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited. Particular features described herein may be used in combination with other describes features in each of the various combinations and permutations.

BRIEF DESCRIPTION OF THE DRAWINGS

Embodiments of the invention will now be described, by way of example only, and with reference to the following drawings.

DETAILED DESCRIPTION

In the following, a detailed description of the drawings will be given. All illustrations in the drawings may be schematic.

Firstly, a block diagram of the method of selecting an object will be described. Afterwards, several method and system components and related elements will be described.

Figure 1:
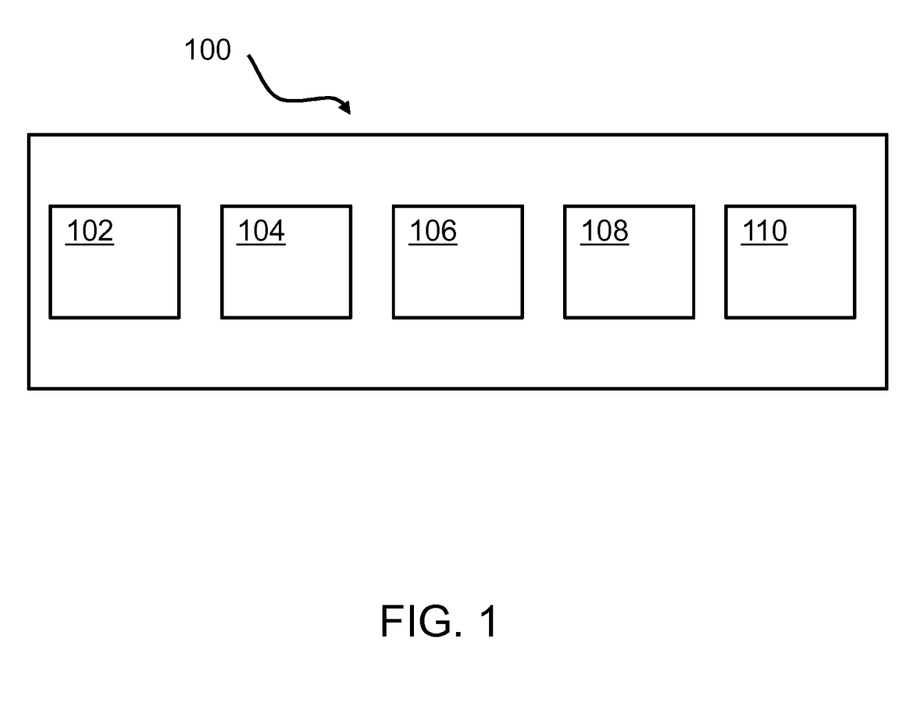
FIG. 1 shows a block diagram of an embodiment of the inventive method of selecting an object.

FIG. 1 shows a block diagram of an embodiment of the inventive method 100 of selecting an object out of a group of objects. The object may belong to a category. The method may comprise receiving, 102, object-related information indicative of properties of objects of the category by using network connected databases. The databases may be publicly available databases, e.g., accessible over the Internet, or private and secured databases. The term "database" may be interpreted broadly. Any information available over the Internet may be used. Additionally, any kind of information stored in company networks may be used. Information in files stored in file systems may also be seen as databases.

The method may further comprise generating, 104, an extended profile for at least one of the objects based on the received object-related information and object-specific information indicative of properties of the at least one of the objects, such that the extended profile comprises the object-specific information as well as object-related information that is related to the object-specific information, and wherein the generating the extended profile comprises using at least one out of the group consisting of a predefined dictionary, a predefined ontology, predefined system rules, and a predefined regular expression. Furthermore, a user interface adapted for receiving natural language input may be provided, 106. The method may additionally comprise determining, 108, a data structure of weighted keywords based on the natural language input using at least one out of the group consisting of a predefined dictionary, a predefined ontology, predefined system rules, and a predefined regular expression, and selecting, 110, the object out of the group of objects based on a mapping of the extended profile and the data structure of weighted keywords resulting in a preference fit score for the selected object, wherein the mapping comprises using at least one out of the group consisting of an N-Gram distance function between data elements of the extended profile and data elements of the data structure of weighted keywords, thresholds specified in the extended profile, and weights of rules.

Furthermore, parts of the data stored in the extended profile, e.g., an object name or product name, may be displayed together with their related preference fit score in a table-like form. A user may then decide by selecting one of the displayed objects whether the recommended object may really fit his preferences. It may be clear that a 100% preference fit score may be achieved only in selected cases. The displaying may also comprise a picture of the object. The object may be displayed together with a descending or ascending preference fit score. An exemplary structure of a displayed list may be shown in the following table:

TABLE 1

| Name of the object | Picture of the object | Attributes of the object | Preference fit score |
|---|---|---|---|
| object 1 | picture 1 | set 1 of attributes | 85% |
| object 2 | picture 2 | set 2 of attributes | 73% |
| object 3 | ... | ... | ... |
| ... | | | |

Figures 2, 3:
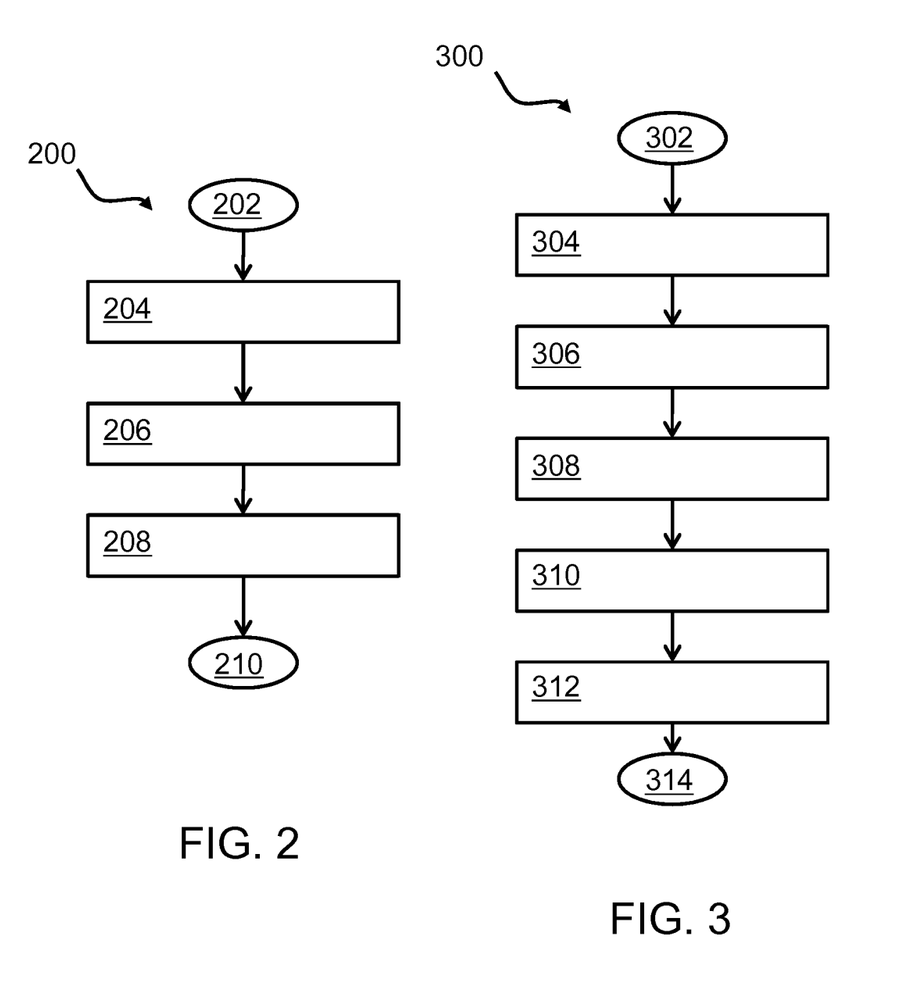
FIG. 2 illustrates an embodiment of a flowchart of determining an extended profile.
FIG. 3 illustrates an embodiment of a flowchart of determining a preference fit score.

FIG. 2 illustrates an embodiment of a flowchart 200 for determining an extended profile. The process may start at 202. As an initial step, object-related information may be received, 204. Additionally, object-specific information may be received. The object-specific information may comprise a set of attributes describing the object in a storable form as structured information. In case of a car as an example for an object, the attributes may comprise objectives of the car, like color, engine size, power of the engine, number of seats, wheel size, age of the car, model number, model name, etc. The object-related information may be a mixture of structured and unstructured data. In this context, the unstructured information may comprise at least text information, image information, and sound information. Sources for the object-related information may be large databases on public networks, like the Internet, or press archives or databases of manufacturers of the object, just to name a few. In case of family homes or industrial equipment as another example of an object, the attributes may look completely different. The attributes of the object-related information may depend strongly on the category of the object.

In a next step, the object-related information may need to be analyzed. For this purpose, the method may use predefined and pre-filled dictionaries, predefined ontologies relating to the object category, and one or more predefined system rules. This background information may be used to relate elements of the object-related information to attributes of the object-specific information. In this way, the mostly simple attributes of the object may be interpretable in a much wider context. A query against the extended profile of the object may not only require a simple miss or match comparison, but also, a so-called context-cloud, related to or being part of each attribute of the extended profile, may be used for a query. A relationship building of object-related information attributes to the object-specific information attributes may be performed in step 206. After the analysis and determination, as described above, the extended profile may be stored, 208.

Such an extended profile may be determined for any available object. Comparisons may be made between the different available objects. The sequence may end at 210.

Figure 6:
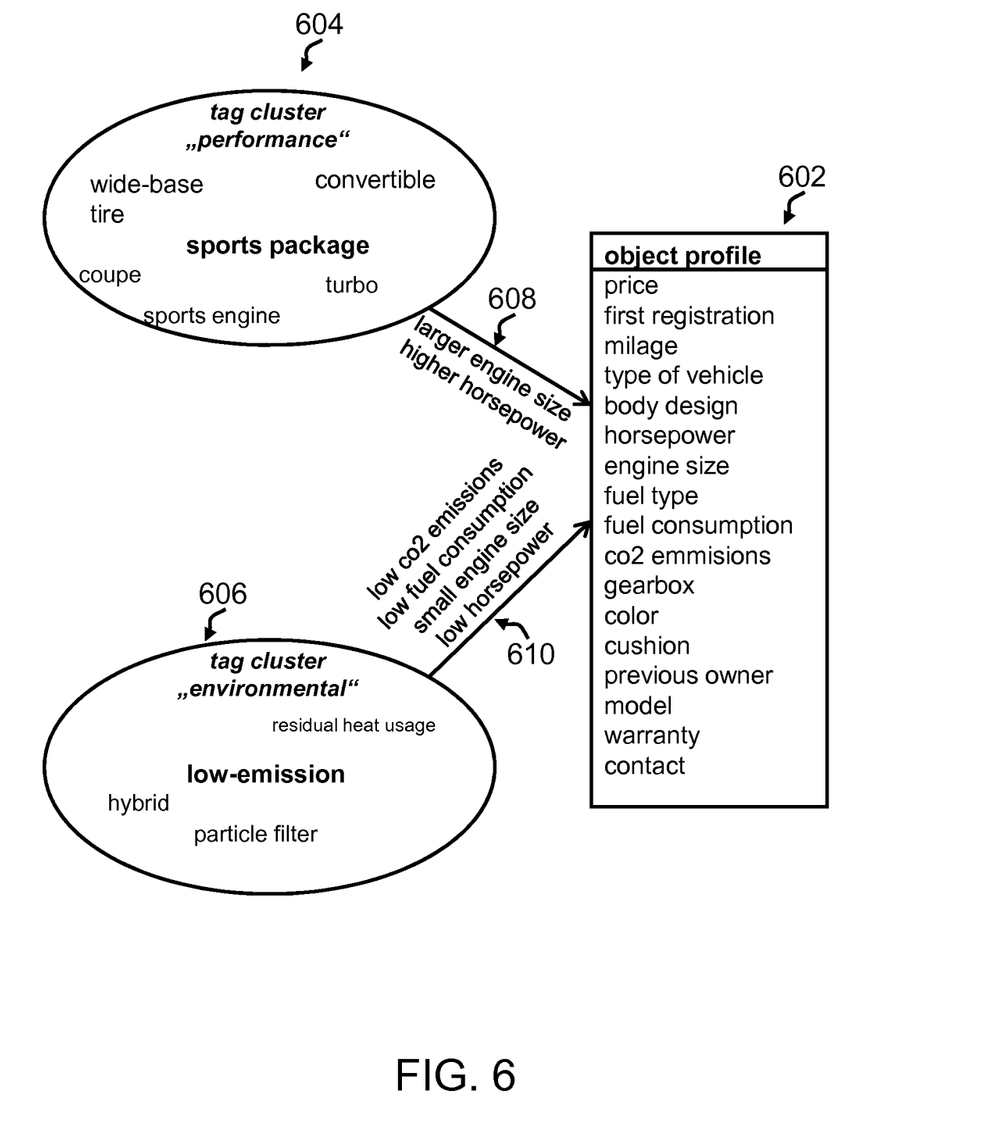
FIG. 6 shows an embodiment of relationships between an object-related profile and context tag clusters.

In addition to the above described determination of an extended profile, context clusters may be determined out of features of the object-related information and attributes of the object-specific information. In case of a car, one of the context clusters may be named "performance". This context cluster may comprise, e.g., the following features and/or attributes: wide-base tire, convertible, coupe, sportive, sports package, high-performance, and so on as illustrated in FIG. 6, reference numeral 604. Another context cluster 606, FIG. 6 may be named "environmental": the features and attributes comprised in this context cluster may comprise: hybrid, low emission, particle-filter, residual heat usage, starred-stop-automatic, and so on. A relationship 610 may be determined between the context cluster "environmental" and the feature "$CO_2$ emission" of features in an object-related profile 602 of an exemplary car comprising context interpretations like "low carbon dioxide emission", "low fuel consumption", "small engine size", "low horsepower", etc. In case of the context cluster "performance", another relationship 608 may be built between this context cluster 604 and an attribute "fuel type" of the object-specific information or profile 602 comprising "large engine size", "higher horsepower", etc. The examples given may be just simple ones, and a skilled person may understand how to build more complex context clusters and relationships. An example of a longer list of attributes of an object-specific or in short object profile for, e.g., the product category "car" may be given in FIG. 6, reference numeral 602.

Figure 4:
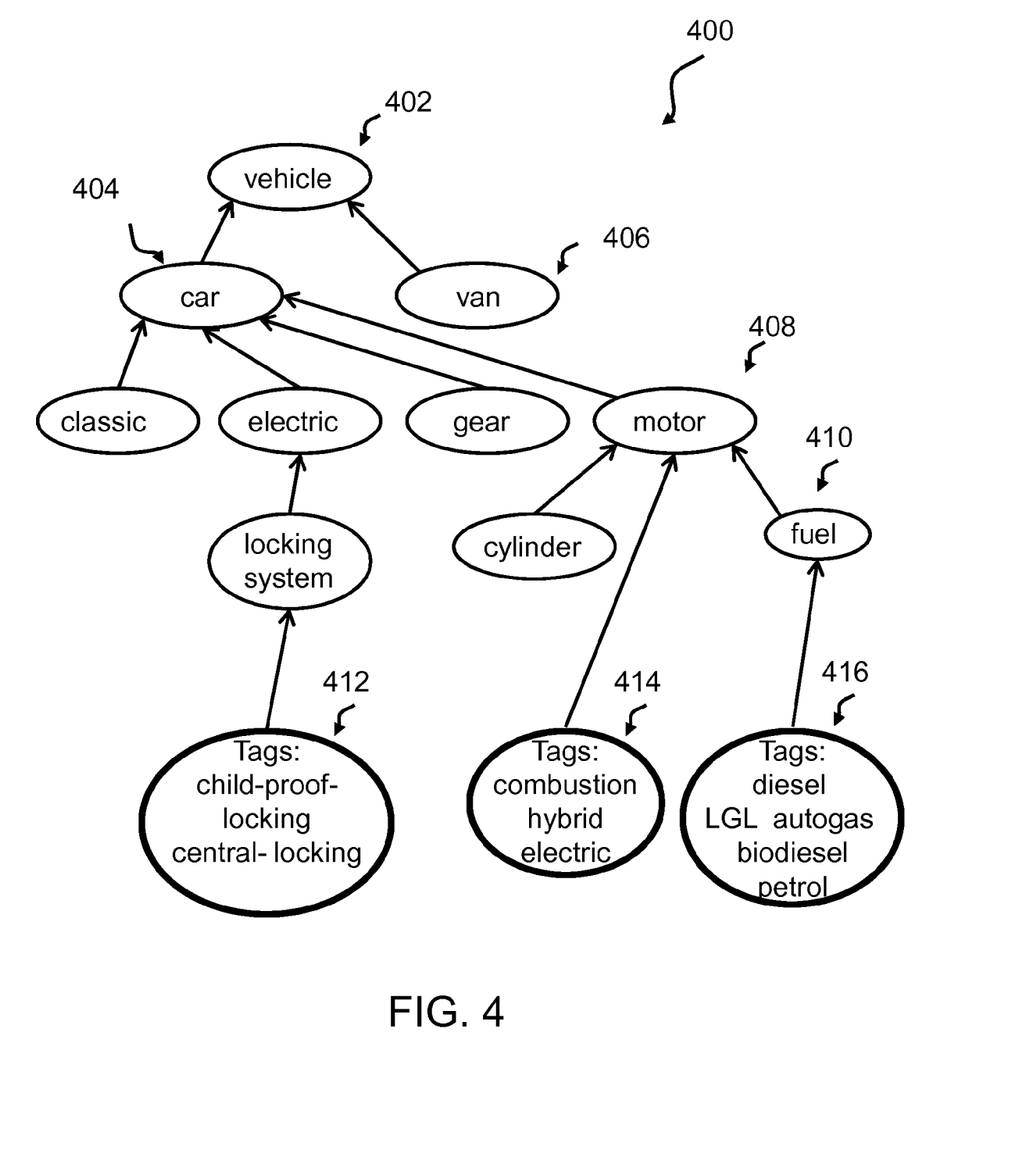
FIG. 4 illustrates an embodiment of a dendogram of the term "vehicle".
Figure 5:
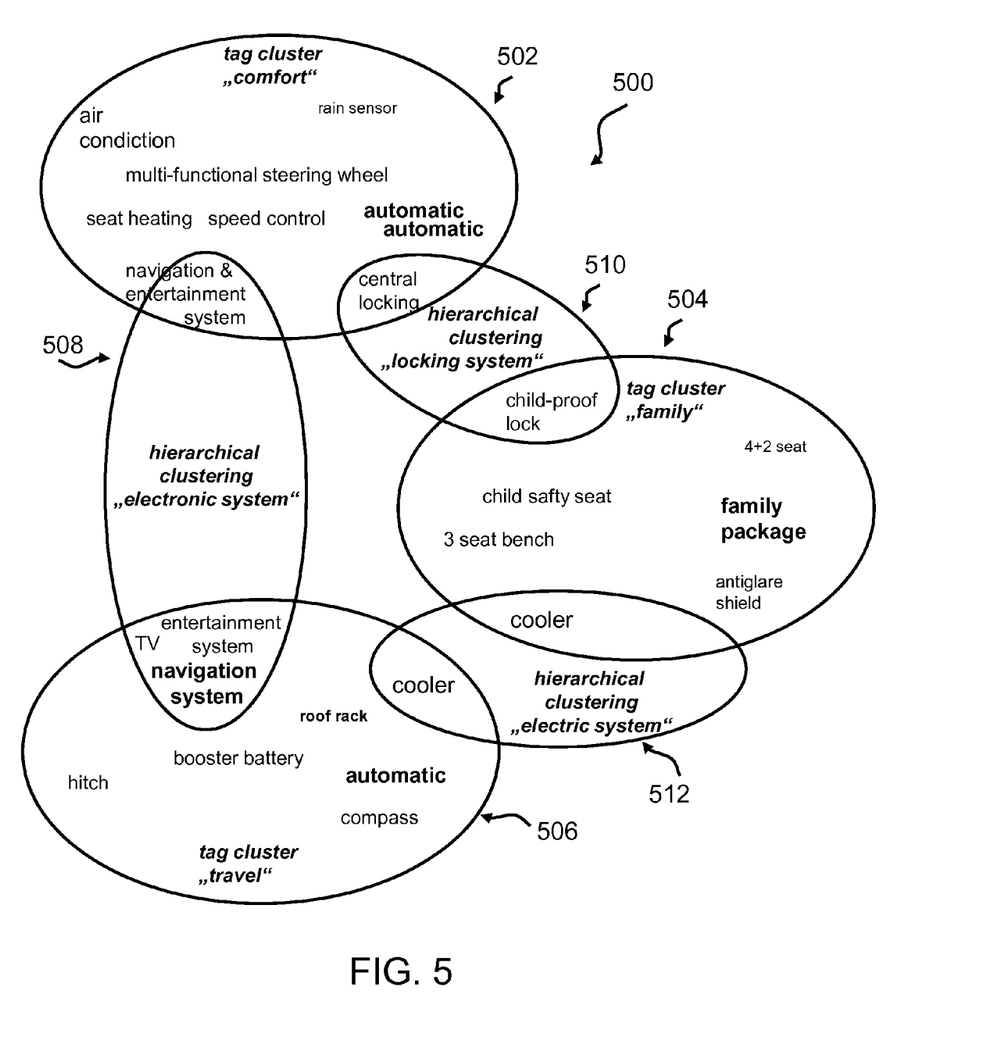
FIG. 5 shows an example of an embodiment of different tag clusters.

The concept of context clusters 500 as a basis for an extended profile of objects may be given in FIG. 5. Several primary tag clusters 502, 504, 506 for the tag cloud "comfort", "family" and "travel" are shown. They may comprise several attributes as shown as part of the ellipses. Secondary tag clusters 508, 510, 512, overlapping the primary tag clusters, may also be recognized. They may comprise attributes already being used in the primary tag clusters 502, 504, 506. An example may be "central locking" and "child-proof lock", building a new tag cluster 412 (FIG. 4) named "locking system". A person skilled in the art may easily recognize other tag clusters and their relationships in FIG. 5.

FIG. 3 may illustrate an embodiment of a flowchart 300 for determining a preference fit score. The sequence may start at 302. In a first step 304, a query for a selection of an object may be received. The query may have the form of a string of natural language words. The words may be related to each other or they may be independent from each other. The words may also be the result of a transcription. In this case, a user may have a microphone as input device. The query may be formulated completely free and may be done in the context world and words of a user. The user may not be restricted by any predefined keywords. The input may also come from sensors. It may be a barcode sensor input combined with, e.g., the words "I like this car". The barcode sensor may have scanned a barcode of an existing car and decoding the unique vehicle identification number (VIN) in a known manner. As a barcode scanner a digital camera of a smartphone may have been used. The same may apply to a picture of a car taken by a digital camera. In an ideal case, the extended profile of the object may also comprise a picture of the object. A skilled person may know how to compare digital pictures and calculate a match factor.

In any case, an interpretation or standardization of the natural language query may be performed, 306. For this, the predefined dictionary, the predefined ontology, and the predefined system rules may be instrumental.

In 308, a data structure of weighted keywords derived from the input may be determined. The data structure of weighted keywords may be a network of weighted keywords comprising relationships between at least some of the keywords. An example of such a data structure may be recognized in table 2.

TABLE 2

| Price | 4 (important) |
|---|---|
| Comfort | 0 (excluded) |
| Safety | 5 (very important) |
| Performance | 4 (important) |
| Environmental | 3 (interested) |
| Family | 1 (not relevant) |
| Travel | 2 (not so important) |
| Luxury | 0 (exclude) |

As may be seen, the preferences may match with the context clusters discussed above. On the right side of the table, preference values may be recognized as numerical (e.g., range 0 to 5) and textual expressions. A fragment of an embodiment of such a data structure may also be recognized in FIG. 7, 714 as buyer's preference.

In a next step of FIG. 3, an object filtering based on quantifiable attributes and logical interconnections between key elements, e.g., keywords of the input may be performed, 310. Then a preference fit score may need to be calculated, 312. The preference fit score may combine a plurality of factors. Typically, keywords of the input may not match exact attributes of the extended profile. Similar keywords may be identified through a 2-, 3-, or 4-Gram distance calculation with different thresholds, e.g., 80%.

In a standardization of the natural language query or input, accents or special characters may be removed or replaced (e.g., translation of "β" to "ss"), case sensitivity may be ignored, and synonyms and acronyms may be identified by object-related dictionaries. An interpretation and semantic analysis of the standardized and still unstructured text may focus on identifying keywords and relationships between them in the object context and ontology. Regular expressions may be used to identify numerical ranges or preferences, e.g., the regular expression {"<","max"}+{" ",":"}*[0-9]+
("."[0-9][0-9])?{|,}*{"$","USD","dollar"} may identify a price preference. Some text elements like "not" may be translated into the system of rules, e.g., the term "cheap" may be translated into a search rule of a lower preference for the object attribute "price" that may be available in the extended profile. But most text elements may be associated with elements, features, or attributes in the extended profile of the object context. Some text elements may not match directly, and N-Gram distance calculations may be required in addition to thresholds defined in the extended profile.

FIG. 4 illustrates a hierarchy 400 that may be useful when performing a semantic analysis of the term "vehicle". Other terms may be analysed accordingly. At the top of the analysis hierarchy the term "vehicle" 402 may be used. This term may have a lower layer 404, 406 splitting the term into two sub-terms "car" and "van". At a next lower level 408 the "car" may be detailed even more by the terms "classic", "electric", "gear", "motor" and other terms. At a next lower level 410 other details may be mentioned like "locking system", "cylinder" and "fuel" (type). To these lowest level attributes 410, feature context tags may be related. The "locking system" may be related to the tags "child-proof-locking" or "central-locking". In a similar way the tags 414 "combustion", "hybrid" and "electric" may be related to the feature "motor". The term/tag relationship example "fuel" may be self-explanatory, 416, to a skilled person.

In addition to the predefined set of rules, see the extended profile, through a direct interpretation of a query, also a preference or user-defined rule may be added to the system of rules for the query, e.g., a preference performance for cars may lead to adding a rule to prefer larger engine sizes if this may not already directly be specified in the query or a similar rule with a higher weight. This implies that also rules may have weights. In case of a conflict, the rule with a higher weight may have a higher priority to be applied.

A pass through a pool of data of objects, e.g., products may filter out the objects where quantifiable attributes may not be inside specified ranges, or a logical interconnection of selected structured text elements may completely not be fulfilled. Each logical AND interconnected structured query text element which may not be fulfillable by the object attributes may reduce the preference fit score of the object by 50%, e.g., all objects may have at most a 25% preference fit score if two text elements may be required in the query which may not be fulfilled.

Each preference fit score of the object may be multiplied by a keyword factor which may be related to the extended profile. This keyword factor may be calculated as following:

$$\frac{\sum_{i=1}^{n} d_p(i)}{1 + \sum_{i=1}^{n} d_p(i)} \times \frac{n+1}{n},$$

where $$d_p(i) := \begin{cases} 0, & t_i \in T_p \\ g_2(t_i, f_i) \times z_i, & t_i \notin T_p \end{cases}$$

$T_p$ may be the set of elements or terms of the extended profile which may be associated to the object p; $t_i$ is the i-th keyword in the group of n keywords from the query; and $f_i$ is the keyword related to $t_i$ which may have been interpreted from the natural language input; $z_i$ may be the weight of the i-th keyword $t_i$ inside the context cluster. The function $g_2$ may be a 2-Gram distance calculation. A keyword factor of 100% may get only those object profiles which may contain the complete set of keywords from the query.

In addition to the multiplication by the keyword factor, the preference fit score may also be multiplied by a preference factor (compare table 2). This preference factor may be calculated through the quadratic mean of the different weighted preferences:

$$\sqrt{\frac{\sum_{i=1}^{k} q_p(i)^2}{k}},$$

where $$q_p(i) := \begin{cases} \left(\frac{m_{p,i}(b_i+1)}{(m_{p,i}+1)b_i}\right)^{w_i-1}, & w_i > 1 \vee b_i > 0 \\ 0, & w_i = 0 \wedge m_{p,i} > 0 \\ 1 & \text{else} \end{cases}$$

$w_i$ may be the i-th weight of k preferences, $b_i$ may be the highest keyword match for the i-th preference in the extended profile of the object context, and $m_{p,i}$ may be the keyword match for the object p and i-th preference. In the detailed selection results of the objects, it may be useful to show also each i-th dimension of $q_p$ such that a user may understand the details of the object fit to a (buyer, compare FIG. 7, 714) preferences if some may be specified.

Finally, the last factors for the score may be defined by the numeric preference factors either explicitly defined through the user interface, or in the natural language input, or implicitly defined by the system of rules. The i-th numeric preference factor may be calculated as following:

$$\frac{(r_i - |a_{p,i} - c_i|)^{\max\{1, v_i\}}}{(r_i - s_i)^{\max\{1, v_i\}}}$$

$v_i$ may be the i-th weight of preferences related to the i-th numeric preference value. This weight may not be equal to the weight w because multiple preferences may relate to the numeric attribute which may be in focus for the numeric preference value. In that case, the difference between the highest and lowest weighted preference may define the weight v, $a_{p,i}$ may be the i-th numeric attribute value of the object p, $r_i$ and $s_i$ may be the worst and best numeric attribute difference to the numeric preference $c_i$ value of all objects in scope. These numeric preference factors may only be multiplied with the preference fit score of the object if it may be directly specified or the weight v may be greater than 1 or implicitly defined by the system of rules.

The output of the selection or recommendation may contain a maximum number of objects with the best preference fit score which may also be higher than a configured threshold. The best preference fit score may be the object of the previous described factors. The procedure may end at 314.

Figure 7:
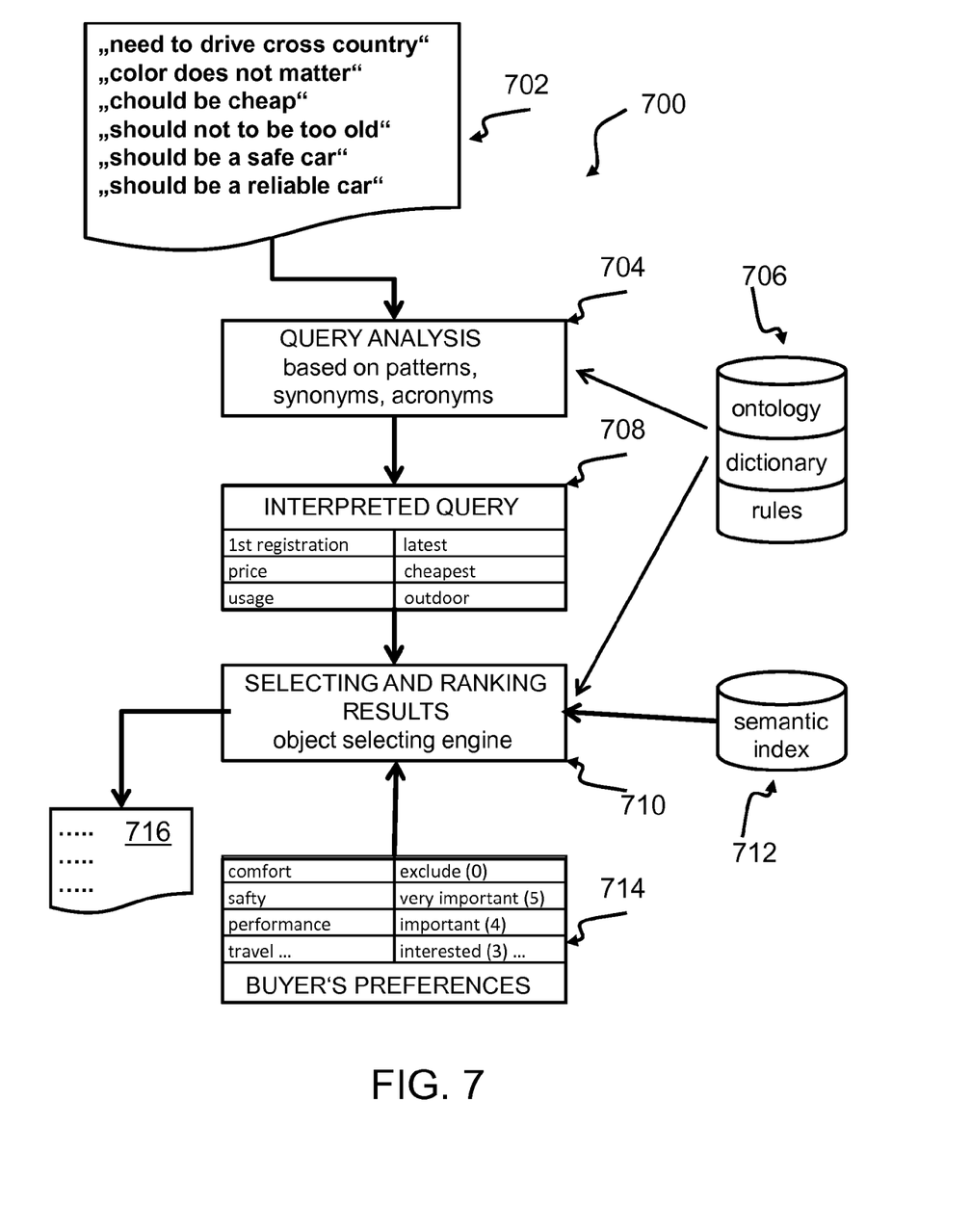
FIG. 7 may give an overview of an embodiment of a general flow of steps of the inventive method and the selection engine.
Figure 8:
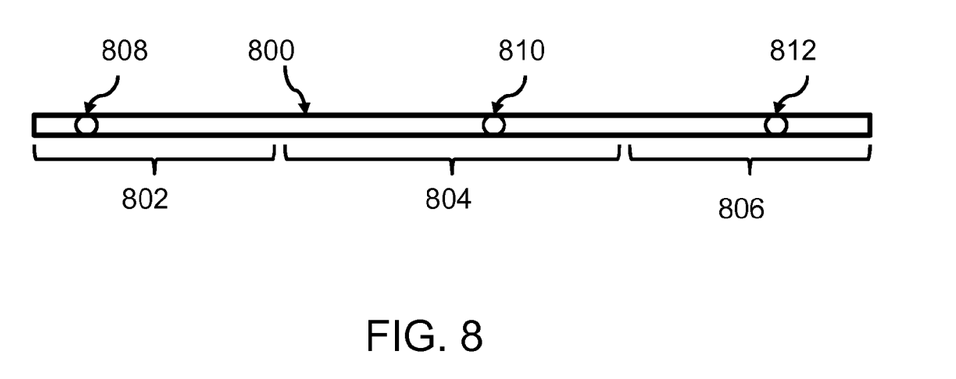
FIG. 8 illustrates an embodiment of a slider with three markers.

FIG. 7 may further illustrate a flow 700 of steps of the method in an exemplary form. Natural language input 702 may be provided by a natural language interface. This input may be analyzed in block 704. An ontology, a dictionary and rules may be instrumental for this step. A result may be an "interpreted query" 708. On the other side, a selector's preferences may be ranked and further specified, 714. The ranking and/or determining an importance of specific selection categories may be done using a graphical user interface. A slider as illustrated in FIG. 8 may be used. Additionally, an index 712 comprising object-related information may be provided. This index may have been created analysing a plurality of different information sources like public and or private databases. A selection engine 710 may select and rank the results of selection process based on a preference fit scope. These results may be displayed on a screen 716. An identifier of the object together with the preference fit scope may be displayed in an ascending order of the preference fit score or a descending order.

FIG. 8 illustrates an embodiment of a slider 800 with three markers. The slider 800 may be a component of a user interface. Its layout may have the form of a one-color or multicolor bar 800. Within the bar 800, three marks or markers 808, 810, 812 may be provided. The bar may be separated into three areas 802, 804, 806. The markers 808, 810, 812 may have different colors. If only one marker is available, a numeric value may be selected by positioning the marker somewhere on the bar 800. The left and right end of the bar 800 may define the range from which the value selection may be performed. In the case of two markers, a lower end value point and a higher end value point may be selectable within the range defined by the end points of the bar 800.

In the case of three markers 808, 810, 812, the limitation of just selecting a range of values may be overcome. In addition to choosing a range within the boundaries defined by the bar 800, also a preferred value may be selected by, e.g., a middle marker 810. A position of this middle marker 810 may be defined by moving it on the bar, e.g., by a pointing device. As an example, the range defined by the end points of the bar may be 100 to 1000. The low end marker 808 may be moved to define the value of 160. The high end marker 812 may be moved to a value of 800. The movement may be performed using a pointing device. A mean value between the values of the low end marker and the high end marker may result in the value 480. However, a user may deviate from this mean value by moving the middle marker 810 to, e.g., 550, 420, or any other value between the low end marker 808 and the higher end marker 812.

Thus, this mechanism delivers in addition a degree of freedom for defining values or preferences in an effective way using a slider. Such a slider may be integrated in a user interface for defining or redefining numerical values.

Figure 9:
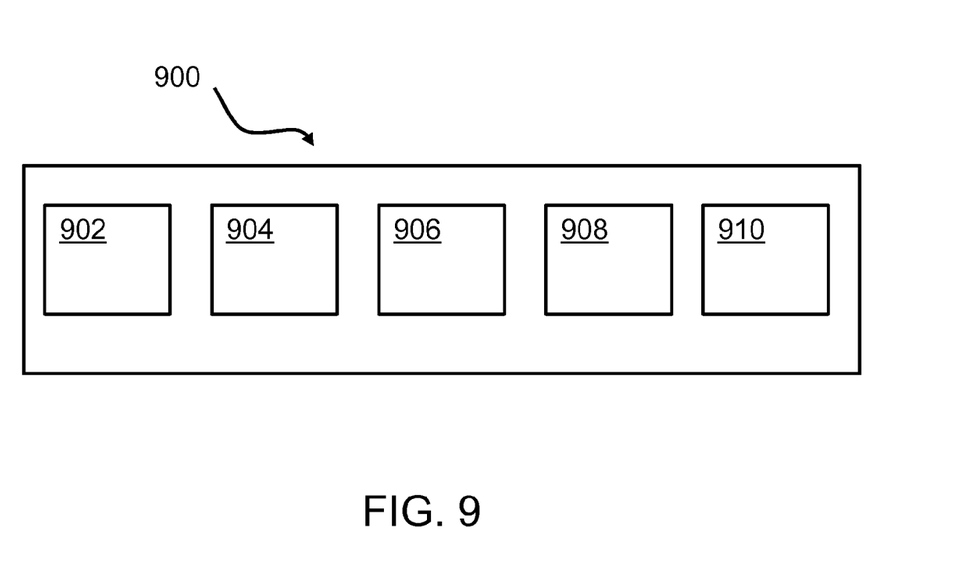
FIG. 9 shows a block diagram of an embodiment of the inventive selection engine.

FIG. 9 shows a block diagram of an embodiment of the inventive selection engine 900 of selecting an object out of a group of objects belonging to a category. The selection engine 900 may comprise a receiving unit 902 adapted for receiving object-related information indicative of properties of objects of the category by using network connected databases. The selection engine may also comprise a generating unit 904 adapted for generating an extended profile for at least one of the objects based on the received object-related information and object-specific information indicative of properties of the at least one of the objects, such that the extended profile comprises the object-specific information as well as object-related information that is related, to the object-specific information, and wherein the generating unit is also adapted for using at least one out of the group consisting of a predefined dictionary, a predefined ontology, predefined system rules, and a predefined regular expression, when generating the extended profile.

A user interface 906 adapted for receiving natural language input may be provided. Additionally, the selection engine may comprise a determining unit 908 adapted for determining a data structure of weighted keywords based on the natural language input using at least one out of the group consisting of a predefined dictionary, a predefined ontology, predefined system rules.

Furthermore, the selection engine may comprise a selecting unit 910 adapted for selecting the object out of the group of objects based on a mapping of the extended profile and the data structure of weighted keywords resulting in a preference fit score for the selected object, wherein the mapping comprises using at least one out of the group consisting of an N-Gram distance function between data elements of the extended profile and data elements of the data structure of weighted keywords 714, thresholds specified in the extended profile, and weights of rules.

Figure 10:
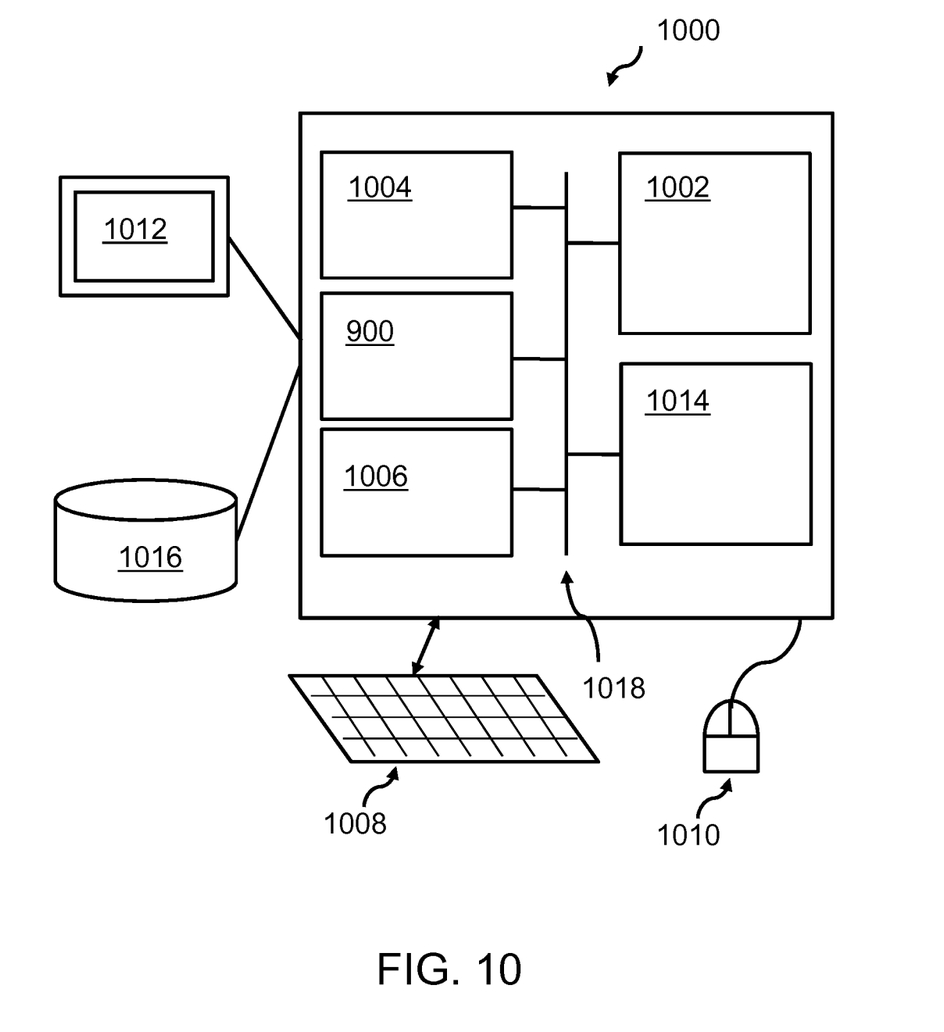
FIG. 10 illustrates an embodiment of a computer system comprising the inventive selection engine.

Embodiments of the invention may partly be implemented on virtually any type of computer, regardless of the platform being used suitable for storing and/or executing program code. For example, as shown in FIG. 10, a computer system 1000, may include one or more processor(s) 1002 with one or more cores per processor, associated memory elements 1004, an internal storage device 1006 (e.g., a hard disk, an optical drive such as a compact disk drive or digital video disk (DVD) drive, a flash memory stick, etc.), and numerous other elements and functionalities typical of today's computers (not shown). The memory elements 1004 may include a main memory, employed during actual execution of the program code, and a cache memory, which may provide temporary storage for at least some program code or data in order to reduce the number of times, code must be retrieved from external bulk storage 1016 for execution. Elements inside the computer 1000 may be linked together by means of a bus system 1018 with corresponding adapters. Additionally, a selection engine 900 may be part of the computer system 1000.

The computer system 1000 may also include input means, such as a keyboard 1008, a mouse 1010, or a microphone (not shown). Furthermore, the computer 1000 may include output means, such as a monitor 1012 (e.g., a liquid crystal display (LCD), a plasma display, a light emitting diode display (LED), or a cathode ray tube (CRT) monitor). The computer system 1000 may be connected to a network (e.g., a local area network (LAN), a wide area network (WAN), such as the Internet, or any other similar type of network, including wireless networks via a server network adapter 1014. This may allow a coupling to other computer systems. Those, skilled in the art will appreciate that many different types of computer systems do exist, and the aforementioned input and output means may take other forms. Generally speaking, the computer system 1000 may include at least the minimal processing, input and/or output means, necessary to practice embodiments of the invention.

Further, those skilled in the art will appreciate that one or more elements of the aforementioned computer system 1000 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

While the invention has been described with respect to a limited number of embodiments, those skilled in the art, benefiting from this disclosure, will appreciate that other embodiments may be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

The invention claimed is:

1. A method of selecting an object out of a group of objects belonging to a category, the method comprising:
receiving object-related information indicative of properties of objects of the category by using network connected databases;
generating an extended profile for at least one of the objects based on the received object-related information and object-specific information indicative of properties of the at least one of the objects, such that the extended profile comprises the object-specific information as well as object-related information that is related to the object-specific information, wherein the generating the extended profile comprises using at least one out of the group consisting of a predefined dictionary, a predefined ontology, predefined system rules, and a predefined regular expression, and wherein the generating the extended profile comprises building clusters of features of the object-specific information and elements of the object-related information, the clusters being specific to the object;
providing a user interface adapted for receiving natural language input;
determining a data structure of weighted keywords based on the natural language input using at least one out of the group consisting of the predefined dictionary, the predefined ontology, predefined system rules, and a predefined regular expression; and
selecting the object out of the group of objects based on a mapping of the extended profile and the data structure of weighted keywords resulting in a preference fit score for the selected object, wherein the mapping comprises using at least one out of the group consisting of an N-Gram distance function between data elements of the extended profile and data elements of the data structure of weighted keywords, thresholds specified in the extended profile, and weights of rules, and wherein the preference fit score is determined based on a combination of: a keyword factor related to the extended profile, a preference factor determined by a quadratic mean of weighted keywords, and a numeric preference factor defined through the user interface or a system of rules, wherein the numeric preference factor is calculated using a formula comprising:

$$\frac{(r_i - |a_{p,i} - c_i|)^{max\{1,v_i\}}}{(r_i - s_i)^{max\{1,v_i\}}}.$$

2. The method according to claim 1, wherein the generating the extended profile comprises relating elements of the object-related information to features of the object-specific information.

3. The method according to claim 1, wherein a weighting of at least one of the weighted keywords is modifiable using the user interface.

4. The method according to claim 1, wherein at least one value of the data structure is modifiable using the user interface.

5. The method according to claim 4, wherein the modification of the at least one value of the data structure is performed by using a slider with at least three marks, the slider being part of the user interface.

6. The method according to claim 1, wherein the determining the data structure of weighted keywords comprises analyzing a user profile.

7. The method according to claim 1, comprising displaying an identifier of the selected object together with the related preference fit score.

8. A selection engine for selecting an object out of a group of objects belonging to a category, the selection engine comprising:
a computer system including a processor that performs a method, the method comprising:
receiving object-related information indicative of properties of objects of the category by using network connected databases;
generating an extended profile for at least one of the objects based on the received object-related information and object-specific information indicative of properties of the at least one of the objects, such that the extended profile comprises the object-specific information as well as object-related information that is related to the object-specific information, wherein the generating the extended profile comprises using at least one out of the group consisting of a predefined dictionary, a predefined ontology, predefined system rules, and a predefined regular expression, when generating the extended profile, and wherein the generating the extended profile comprises building clusters of features of the object-specific information and elements of the object-related information, the clusters being specific to the object;
providing a user interface adapted for receiving natural language input;
determining a data structure of weighted keywords based on the natural language input using at least one out of the group consisting of the predefined dictionary, the predefined ontology, predefined system rules, and a predefined regular expression; and
selecting the object out of the group of objects based on a mapping of the extended profile and the data structure of weighted keywords resulting in a preference fit score for the selected object, wherein the mapping comprises using at least one out of the group consisting of an N-Gram distance function between data elements of the extended profile and data elements of the data structure of weighted keywords, thresholds specified in the extended profile, and weights of rules, and wherein the preference fit score is determined based on a combination of: a keyword factor related to the extended profile, a preference factor determined by a quadratic mean of weighted keywords, and a numeric preference factor defined through the user interface or a system of rules, wherein the numeric preference factor is calculated using a formula comprising:

$$\frac{(r_i - |a_{p,i} - c_i|)^{max\{1, v_i\}}}{(r_i - s_i)^{max\{1, v_i\}}}.$$

9. A computer program product, provided on a non-transitory computer readable medium, comprising a computer readable program for performing a method for selecting an object out of a group of objects belonging to a category when executed on a computer device, the method comprising:

receiving object-related information indicative of properties of objects of the category by using network connected databases;

generating an extended profile for at least one of the objects based on the received object-related information and object-specific information indicative of properties of the at least one of the objects, such that the extended profile comprises the object-specific information as well as object-related information that is related to the object-specific information, wherein the generating the extended profile comprises using at least one out of the group consisting of a predefined dictionary, a predefined ontology, predefined system rules, and a predefined regular expression, and wherein the generating the extended profile comprises building clusters of features of the object-specific information and elements of the object-related information, the clusters being specific to the object;

providing a user interface adapted for receiving natural language input;

determining a data structure of weighted keywords based on the natural language input using at least one out of the group consisting of the predefined dictionary, the predefined ontology, predefined system rules, and a predefined regular expression; and selecting the object out of the group of objects based on a mapping of the extended profile and the data structure of weighted keywords resulting in a preference fit score for the selected object, wherein the mapping comprises using at least one out of the group consisting of an N-Gram distance function between data elements of the extended profile and data elements of the data structure of weighted keywords, thresholds specified in the extended profile, and weights of rules, and wherein the preference fit score is determined based on a combination of: a keyword factor related to the extended profile, a preference factor determined by a quadratic mean of weighted keywords, and a numeric preference factor defined through the user interface or a system of rules, wherein the numeric preference factor is calculated using a formula comprising:

$$\frac{(r_i - |a_{p,i} - c_i|)^{max\{1, v_i\}}}{(r_i - s_i)^{max\{1, v_i\}}}.$$

* * * * *